United States Patent

[11] 3,622,006

| [72] | Inventor | Marc M. Brunner<br>1277 Dogwood Lane, Huntingdon Valley, Pa. |
|---|---|---|
| [21] | Appl. No. | 867,680 |
| [22] | Filed | Oct. 20, 1969 |
| [45] | Patented | Nov. 23, 1971 |

[54] SELF-CLEANING STRAINER FOR PIPELINE
17 Claims, 8 Drawing Figs.

[52] U.S. Cl. .............................................. 210/355,
210/391, 210/448
[51] Int. Cl. .............................................. B01d 33/02
[50] Field of Search ................................... 210/354–356, 391, 396, 397, 398, 446, 448

[56] References Cited
UNITED STATES PATENTS

| 1,446,572 | 2/1923 | Lightfoot | 210/396 X |
| 2,089,215 | 8/1937 | Lomax | 210/396 X |
| 2,936,099 | 5/1960 | Smith | 210/448 UX |
| 2,982,415 | 5/1961 | Contreras | 210/448 X |
| 3,291,313 | 12/1966 | Davis | 210/354 |

*Primary Examiner*—John Adee
*Attorney*—Connolly and Hutz

ABSTRACT: A self-cleaning strainer for a relatively large pipeline has a conical straining element longitudinally mounted in a casing in line with the flow through the pipeline. The straining element is slowly rotated past an adjacent collecting trough to wash debris into it. The straining element can be rotated by various drive means, from either its front or back end, which may utilize a motor, a transmission (such as chain and sprocket or gears) or a propeller rotated by the flow of water through the casing. The propeller may be connected to the straining element through a transmission which allows it to rotate relatively fast while the filter element rotates at a relatively slower speed.

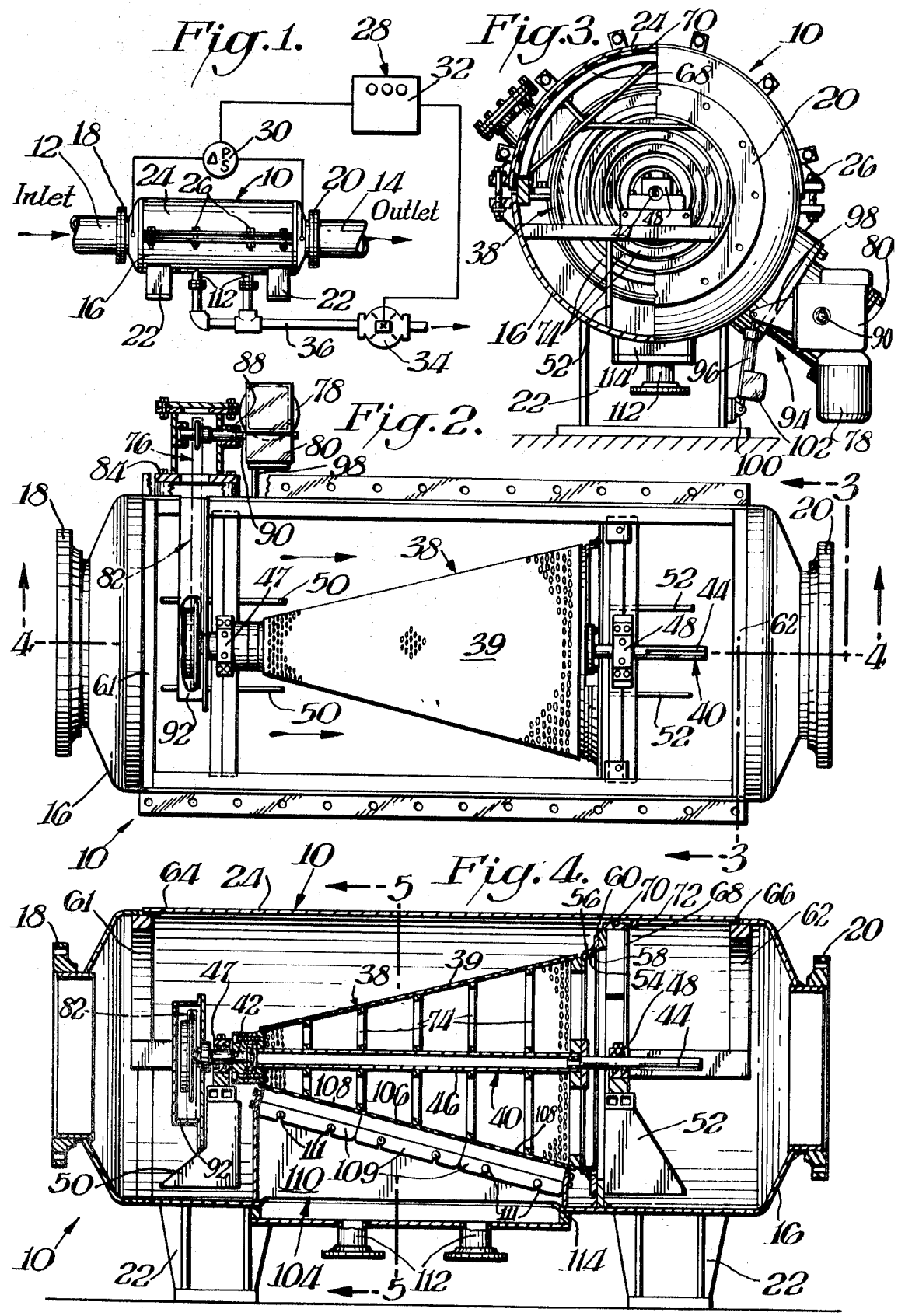

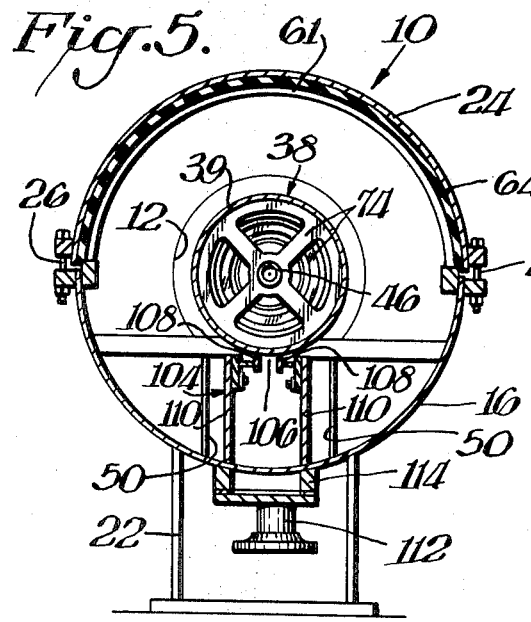
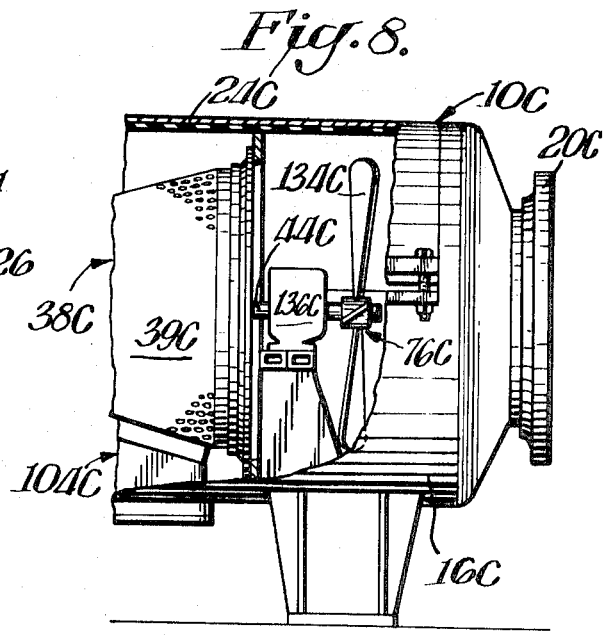
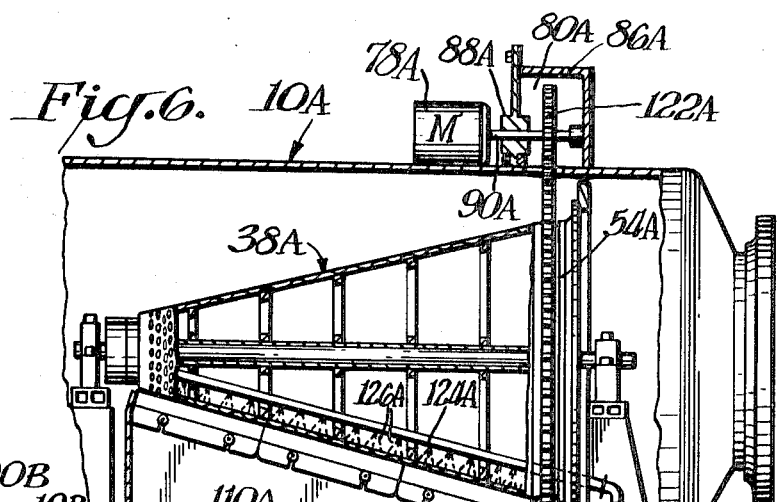
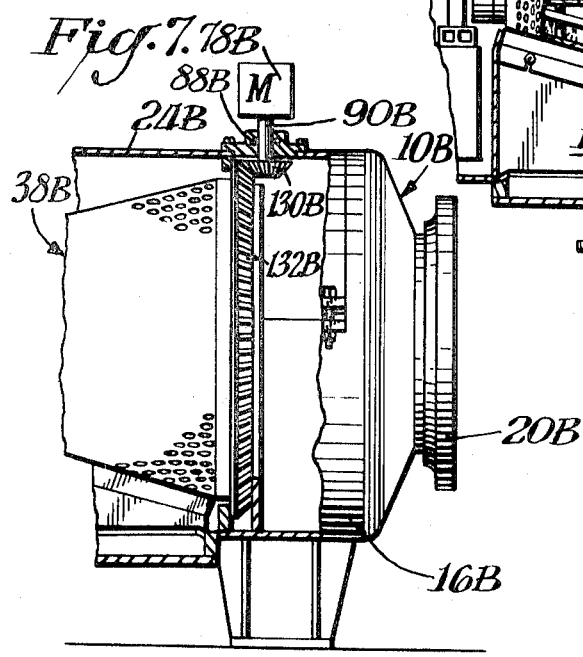

SELF-CLEANING STRAINER FOR PIPELINE

BACKGROUND OF THE INVENTION

Various self-cleaning strainers for large pipelines including collecting troughs draining to atmosphere have been proposed. All of these preexisting devices have a direction of flow substantially perpendicular to the direction of flow through the pipeline to which they are connected. Such strainers therefore create turbulence and loss of head and require auxiliary power to drive them. An object of this invention is to provide a self-cleaning strainer for a pipeline which introduces minimal obstruction to flow and loss of head and which facilitates rotation thereof. Another object is to provide such a strainer which need not employ auxiliary power to rotate it.

SUMMARY

A conical straining element is mounted within a substantially cylindrical casing connected in line with the flow through the pipeline and rotates about the longitudinal axis of the casing, thus minimizing obstruction to flow. A trough is disposed adjacent the outside of the straining element to drain the collected debris from it to atmosphere. The straining element is easily rotated by a drive which may employ a motor mounted outside of the casing or a propeller connected to the straining element. The propeller automatically rotates it in response to flow of fluid and may be connected through a stepdown transmission, which allows the propeller to rotate at efficient higher speeds while the straining element rotates at lower speeds.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which:

FIG. 1 is a schematic diagram of one embodiment of this invention and its controls connected in a pipeline system;

FIG. 2 is a plan view of the embodiment shown in FIG. 1 with the top of the casing removed;

FIG. 3 is a cross-sectional view taken through FIG. 2 along the line 3—3;

FIG. 4 is a longitudinal cross-sectional view taken through FIG. 2 along the line 4—4;

FIG. 5 is a cross-sectional view taken through FIG. 4 along the line 5—5;

FIG. 6 is a longitudinal view in elevation partially broken away in cross section of another embodiment of this invention;

FIG. 7 is a longitudinal view in elevation partially broken away in cross section of still another embodiment of this invention; and FIG. 8 is a cross-sectional view partially broken away in cross section of a further embodiment of this invention.

DESCRIPTION OF THE PREFERRED EMBODIMENTS

In FIG. 1 is shown a self-cleaning strainer 10 installed in line with the flow through a pipeline consisting of inlet pipe 12 and outlet pipe 14. Strainer 10 includes a cylindrical casing 16 which is connected to pipes 12 and 14 by flanges 18 and 20. Pipes 12 and 14 are relatively large, for example 14 inches in diameter and over. Such large pipes are used to carry circulating water for power generating stations and for municipal water supplies. Casing 16 is large enough to minimize the drop in head through the strainer. It thus may have a larger diameter than the pipeline to minimize losses resulting from the resistance of the straining element in the strainer.

Casing 16 is mounted upon supports 22. Its upper section 24 is removably connected to the rest of the casing by bolts 26 to provide access to the interior. Control system 28 includes a pressure differential detector 30 (which senses the pressure drop across the strainer) and a valve operating control device 32. Valve operating control device 32 controls the opening and closing of solenoid operated drain valve 34 connected in drain line 36. Drain line 36 is connected in a manner later described to drain away debris collected from the strainer. Control system 28 opens valve 34 to drain this debris out of the strainer whenever the pressure across the strainer exceeds a predetermined pressure drop. Details of strainer 10 are described in conjunction with the following figures.

FIG. 2 shows the interior of strainer 10 revealed when upper section 24 is removed from lower section 16. A conical foraminous straining element 38 is mounted to rotate within casing 16. Straining element 38 is accordingly secured to axial shaft 40 having a solid upstream end 42, a solid downstream end 44 and a hollow intermediate section 46. Upstream shaft section 42 is rotatably mounted in bearing 47 and downstream shaft section 44 is rotatably mounted in bearing 48. Bearings 47 and 48 are mounted upon supports 50 and 52 within casing 16.

Straining element 38 also includes a conical foraminous sheet 39 of straining material. Any suitable straining material may be used such as woven wire cloth or perforated sheet material. The perforations may be from one-half inch to one-thirty second of an inch in area. Suitable mesh sizes in woven wire cloth may range from approximately 20 to 200 mesh. The material should also be corrosion resistant for the particular service. Salt water service requires special materials which are resistant to salt water corrosion. Straining screen 39 is supported upon a series of hollow rings 74 secured to hollow shaft section 46.

The downstream or base end of straining element 38 consists of a ring 54. Inclined annular skirt 56 is secured upon the periphery of ring 54 to provide an annular sealing groove 58. Stationary ring 60 within casing 16 rides within groove 58 to provide a seal between straining element 38 and the outside of casing 16. Upper section 24 is sealed to upstream and downstream semicircular rings 61 and 62 within casing 16 by gaskets 64 and 66 and it is also sealed to the top of semicircular hollow ring 68 which supports sealing ring 60 by gaskets 70. Semicircular lug 72 within upper section 24 helps locate it in position when it is assembled.

Straining element 38 is rotated by driving means 76 including electric motor 78, gear box 80 and a chain and sprocket transmission 82 extending into casing 16 through boss 84. The outer portion of chain and sprocket transmission 82 is sealed within box 86 which is bolted to boss 84. Stuffing box 88 seals shaft 90 extending from gear box 80 into transmission box 86. The interior portion of chain and sprocket transmission 82 is protected within elongated shield 92 and it is connected to the upstream solid shaft 42 of straining element 38 to impart rotation thereto. Electric motor 78 rotates at standard electric motor speeds and the step down provided by gear box 80 and chain and sprocket transmission 82 provides a slower rotation to straining element 38 on the order of 10 r.p.m. and less. A rotation of straining element 38 of 2 or 3 r.p.m. is adequate for the self-cleaning function later described.

In FIG. 3 is shown movable support 94 for motor 78 and gear box 80. Movable support 94 includes a hydraulic piston and cylinder assembly 96 connecting rib 98 on gear box 80 to lug 100 on casing support 22. Control switch 102 is connected to piston and cylinder assembly 96 to cut off rotation of the motor upon predetermined movement of piston and cylinder assembly 96. Control switch 102 is, for example, a microswitch or mercury switch. If straining element 38 becomes jammed for any reason, the excessive back force on motor 78 and gear box 80 will cause sufficient movement of piston and cylinder assembly 96 to cause control switch 102 to cut off rotation of motor 78.

FIGS. 4 and 5 show collecting trough 104 and its elongated mouth 106 disposed closely adjacent the outer surface of straining element 38. FIG. 5 shows lips 108 of mouth 106 disposed in close proximity to the periphery of straining element 38. Lips 108 are provided by the top edges of angular sections 109. Sides 110 of trough 104 are disposed substantially vertically to minimize collection of debris thereon. Angular sections 109 are adjustably secured to 110 by cap screws 111. This permits the longitudinal spacing of angular sections 109 to be adjusted relative to each other as well as the positions of lips 108 to be adjusted relative to straining element 38 to accommodate varying flow rates and water conditions. Drain connections 112 are provided on the outside of casing 16 in connection with the outer section 114 of trough 104 for connection to drain line 36, as shown in FIG. 1.

Straining device 10 shown in FIGS. 1–5 offers a relatively low resistance to flow through it by virtue of its aligned direction of flow through the pipeline including inlet pipe 12 and outlet pipe 14 to which it is connected. Pressures within such large capacity pipelines are at least in the neighborhood of 10 to 15 p.s.i.g. Such pressures are sufficient to provide a 7 p.s.i.g. minimum differential with atmosphere in drain line 36 sufficient to flush debris outwardly from straining element 38 into trough 104 and from there to drain it to atmosphere through drain line 36 when flow valve 34 is opened. Such opening can be as previously described automatically provided by the pressure drop sensed by detector 30 or it may be obtained on a timed basis. Positive flushing of the straining element may also be obtained in the manner later described in conjunction with FIG. 6.

In FIG. 6 is shown a slightly different straining device 10A having a similar straining element 38A which is driven at its rear end through a large annular toothed wheel 120A secured about the periphery of ring 54A at the downstream end of straining element 38A. Toothed wheel 120A is conveniently provided by fastening a sprocket chain about the periphery of ring 54A. Toothed wheel 120A is driven by toothed pinion wheel 122A, which is for example of the sprocket wheel type. Sprocket wheel 122A is driven by electric motor 78A whose shaft extends into box 86A. Sealed bearing 88A prevents leakage out along motor shaft 90A.

Positive flushing line 124A having a series of spray nozzles 126A extends within the inside of straining element 38A for directing a positive flushing stream through it into trough 104A. Flushing line 124A is connected to a source of external water pressure 128A. Water is sprayed through nozzles 126A to flush straining element 38A at suitable intervals, actuated by a device similar to control device 32.

FIG. 7 shows a modification of the drive shown in FIG. 6 in which the toothed sprocket drive is replaced by a bevel gear pinion 130B connected to motor shaft 90B. Pinion 130B meshes with large annular bevel gear 132B connected on the downstream end of straining element 38B in a similar manner to sprocket wheel 120A shown in FIG. 6.

In FIG. 8 is shown a modified drive 76C for straining element 38C. This modified drive includes a propeller 134C connected to downstream shaft 44C through a compound speed reducing device 136C. Speed reducing device 136C is for example a compound gear train of any suitable type. It may be sealed from the liquid or be made of materials and in a manner to be unaffected thereby. Propeller 134C is rotated by the flow of fluid or liquid through casing 16C. Strainer 10C thus requires no auxiliary source of power to rotate straining element 38C. This avoids the expense and trouble of providing an electric motor and a connection through casing 16C. Propeller 134C is protected from debris by its disposition downstream of straining element 38C. This protection would also be provided by connecting a drive, such as shown in FIGS. 2–4, to the downstream shaft 44C of straining element 38C.

Other types of water actuated drives may also be utilized. Some form of speed reduction is usually necessary for these drives because water actuated propellers should rotate for best efficiency at relatively higher speeds than the straining element. An efficient speed for a propeller of from 50 to 100 r.p.m. should thus be stepped down to a normal slower speed for straining element 38 of approximately 2 or 3 r.p.m. The drive from the propeller may be to the shaft of the straining element 38C or to its periphery as desired. A pulley and belt speed reduction system might be advantageous for submerged use because lubrication is not critical and it offers slight obstruction to flow.

I claim:

1. A self-cleaning strainer for a pipeline comprising a cylindrical casing having a longitudinal axis, coupling means on said casing for connecting it to said pipeline with said longitudinal axis aligned with the direction of flow through said pipeline, a conical foraminous straining element disposed within said casing and having an axial shaft, rotatable support means mounting said straining element and its axial shaft within said casing for rotation upon said longitudinal axis, drive means connected to said straining element for causing it to rotate slowly about said longitudinal axis, an elongated collected trough disposed within said casing and having an elongated mouth, said elongated mouth being disposed closely adjacent the outer surface of said straining element whereby debris collected on said outer surface of said straining element is removed into said trough, and drain means from said trough for removing said debris therefrom.

2. A strainer as set forth in claim 1 wherein said drive means comprises electric motor means and transmission means connecting said electric motor means to said straining element.

3. A strainer as set forth in claim 2 wherein said electrical motor means is mounted outside of said casing and said transmission means extends from said electric motor means through said casing into connection with said straining element.

4. A strainer as set forth in claim 3 wherein said transmission means comprises chain and sprocket means.

5. A strainer as set forth in claim 1 wherein said straining element has a downstream end which is smaller than its upstream end, a portion of said axial shaft extending from the front end of said straining element and said drive means being connected to said extended portion of said shaft.

6. A strainer as set forth in claim 1 wherein said straining element has a downstream end which is smaller than its upstream end, a portion of said axial shaft extending from the back end of said straining element, and said drive means being connected to said extended portion of said shaft.

7. A strainer as set forth in claim 1 wherein said drive means comprises an annular toothed wheel disposed about the larger end of said straining element, toothed pinion wheel in engagement with said annular toothed wheel, and a motor connected to rotate said toothed pinion wheel.

8. A strainer as set forth in claim 1 wherein said drive means comprises axial flow propeller means disposed within said casing, free rotating means mounting said propeller means within said casing, and connecting means between said propeller means and said straining element whereby said straining element is rotated in response to the flow of fluid through said casing.

9. A strainer as set forth in claim 8 wherein said connecting means comprises a geared transmission whereby relatively faster rotation of said propeller means turns said straining element at a relatively slower speed.

10. A strainer as set forth in claim 9 wherein said geared transmission comprises a compound gear train.

11. A strainer as set forth in claim 1 wherein said straining element has a smaller downstream and larger upstream ends, and sealing means between said larger upstream end and said casing whereby flow through said casing is confined through said straining element.

12. A strainer as set forth in claim 1 wherein positive flush means is mounted within said straining element opposite said mouth of said trough whereby positive cleaning of said straining element is accomplished.

13. A strainer as set forth in claim 1 wherein said trough is substantially vertically mounted to avoid collection of debris upon its sides.

14. A strainer as set forth in claim 1 wherein said straining element has an apex and a base, said apex being disposed upstream of said base, and said drive means being disposed downstream of said base whereby it is protected from impingement of debris by said straining element.

15. A strainer as set forth in claim 1 wherein said elongated mouth is adjustably connected to said elongated collecting trough whereby the position of said elongated mouth relative to said outer surface of said straining element may be varied.

16. A strainer as set forth in claim 1 wherein said elongated mouth comprises separate sections longitudinally aligned with each other.

17. A strainer as set forth in claim 16 wherein said separate sections each comprise an angular section having a pair of legs, one of said pair of legs being disposed closely adjacent said outer surface of said straining element and the other of said pair of legs being adjustably connected to said elongated collecting trough.

* * * * *